United States Patent [19]

Renner et al.

[11] 4,160,859

[45] Jul. 10, 1979

[54] CURABLE MIXTURES BASED ON MALEIMIDES AND ACETONE-ANIL

[75] Inventors: Alfred Renner, Münchenstein; Abdul-Cader Zahir, Oberwil, both of Switzerland

[73] Assignee: Ciba-Geigy Corporation, Ardsley, N.Y.

[21] Appl. No.: 783,571

[22] Filed: Apr. 1, 1977

[30] Foreign Application Priority Data

Apr. 8, 1976 [CH] Switzerland ............... 4441/76

[51] Int. Cl.² .................. C08G 69/26; C08G 73/10
[52] U.S. Cl. .................. 528/322; 528/170; 528/321; 528/327
[58] Field of Search ....... 260/78 UA, 47 UA, 47 CZ; 528/322, 327, 321, 170

[56] References Cited

U.S. PATENT DOCUMENTS 4,066,621  1/1978  Müller .................. 260/78 UA

*Primary Examiner*—Harold D. Anderson
*Attorney, Agent, or Firm*—Luther A. R. Hall

[57] ABSTRACT

Mixtures which can be cured to give moulded materials having technically very valuable mechanical and dielectric properties, characterized in that they contain (a) mono-, bis- or tris-maleimides and/or maleimide prepolymers of the maleimides with an aliphatic, cycloaliphatic or aromatic diprimary diamine,
(b) acetone-anil, and optionally
(c) a copolymerizable compound containing at least one olefinic C=C double bond in the molecule.

5 Claims, No Drawings

CURABLE MIXTURES BASED ON MALEIMIDES AND ACETONE-ANIL

The present invention relates to new curable mixtures of maleimides and acetone-anil, and also to processes for producing cross-linked copolymers from these mixtures.

The use of polyimides of unsaturated dicarboxylic acids, such as for example maleimides, for producing polyaddition and polymerisation products is known. Thus, for example, the polyaddition of N,N'-bis-maleimides with primary diamines and the curing of these pre-adducts by thermal polymerisation are described in the French Pat. No. 1,555,564. The polymers obtained are however inadequate for many application purposes since they have comparatively low dimensional stability at elevated temperature.

The polymers obtained by thermal homopolymerisation of bismaleimides do have a dimensional stability at elevated temperature which is better than that of the polymers produced according to the French Pat. No. 1,555,564, but they have the disadvantage that the mechanical properties, especially the impact bending strength, of these products are inferior. Furthermore, the polymerisation products from bismaleimides do not have a high resistance to heat ageing. On prolonged exposure to heat, these products become noticeably more brittle and are finally destroyed.

Thermosetting compositions from bis-maleimides, polyamines and allyl esters are claimed in the German Offenlegungsschrift No. 2,131,735. The allyl esters, particularly allylphthalate, are added obviously for the purpose of lowering the viscosity of the starting mixtures. These are obtained as a result however mixtures which, by virtue of too short a processing time, are not so good for the production of complicated moulded articles, the filling out of hollow spaces and gaps and the embedding of substances. It was moreover possible to establish that polymers which had been obtained by reaction of bis-maleimides with allylphthalate alone had poor properties after heat ageing (270° C.).

It has now been found that mixtures of maleimides, and/or maleimide pre-polymers and acetone-anil can be converted by easy processing into cross-linked copolymers which do not have the aforementioned disadvantages or have them to a greatly reduced extent. The new copolymers have good mechanical properties along with a comparatively high dimensional stability at elevated temperature. In particular, the new copolymers are characterised by an increased resistance to heat ageing.

The present invention hence has as its subject matter new curable mixtures which contain (a) maleimides of the general formula I

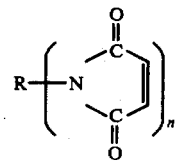

wherein R represents an n-valent aliphatic or aromatic radical, and n represents the number 1, 2 or 3, and/or maleimide pre-polymers which are obtained by reaction of maleimides of the formula I with an aliphatic, cycloaliphatic or aromatic diprimary diamine containing 2–40 C atoms in the molecule, whereby to 1 imido group equivalent is used 0.05 to 1 amino group equivalent;

(b) acetone-anil; and, optionally, (c) a copolymerisable compound containing at least one olefinic C=C double bond in the molecule.

The curable mixtures preferred are those which contain (a) maleimides of the general formula I

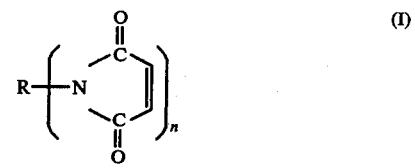

wherein R represents an n-valent aliphatic or aromatic radical, and n represents the number 1, 2 or 3, (b) acetone-anil; and, optionally, (c) a copolymerisable compound containing at least one olefinic C=C double bond in the molecule.

Mixtures according to the invention preferably contain maleimides of the given formula wherein R represents a mono- or bivalent aromatic radical, and n represents the number 1 or 2.

In a particular embodiment, the curable mixtures contain maleimides of the given formula I wherein R represents an unsubstituted phenyl group or a phenyl group substituted by methyl or halogen atoms, or wherein R represents in particular an unsubstituted phenylene radical or a phenylene radical substituted by methyl, or a radical of the formula

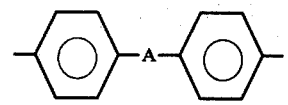

wherein A represents methylene, an ether oxygen atom or sulphonyl.

The radical R in the maleimides of the given formula can represent a linear or branched alkyl or alkylene radical having less than 20 carbon atoms, a phenyl or phenylene radical or a radical of the formula

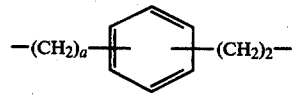

wherein a represents an integer from 1 to 3. The radical R can also comprise several phenylene radicals, which are bound together directly or by a single valence bond, or by an atom or an inert group, such as for example oxygen or sulphur atoms, or alkylene groups having 1 to 3 carbon atoms, or by way of the following groups: —CO—, —SO$_2$—, —NR$_1$— (R$_1$ = alkyl), —N=N—, —CONH—, —COO—, —CONH—A—NHCO—, O=P(O—)$_3$ or S=P(O—)$_3$.

Furthermore, the phenyl or phenylene radicals can be substituted by methyl groups, or by halogen atoms such as fluorine, chlorine or bromine.

The maleimides of the given formula constitute a known class of compounds and can be produced by application of the methods described in the U.S. Pat.

No. 3,522,271 and in the G.B. Pat. No. 1,137,592, i.e. by reaction of the corresponding amines or polyamines with the maleic acid anhydride in a polar solvent and in the presence of a catalyst. Phosphorus-containing maleimides and the production thereof are described in the Belgian Pat. No. 806,071.

The following may be mentioned as special examples of maleimides which can be contained in the mixtures according to the invention:
N,N'-ethylene-bis-maleimide,
N,N'-hexamethylene-bis-maleimide,
N,N'-m-phenylene-bis-maleimide,
N,N'-p-phenylene-bis-maleimide,
N,N'-4,4'-diphenylmethane-bis-maleimide,
N,N'-4,4'-3,3'-dichloro-diphenylmethane-bis-maleimide,
N,N'-4,4'-diphenyl ether-bis-maleimide,
N,N'-4,4'-diphenylsulphone-bis-maleimide,
N,N'-m-xylylene-bis-maleimide,
N,N'-p-xylylene-bis-maleimide,
N,N'-4,4'-2,2-diphenylpropane-bis-maleimide,
the N,N'-bis-maleimide of 4,4'-diamino-triphenyl phosphate,
the N,N'-bis-maleimide of 4,4'-diamino-triphenyl phosphite,
the N,N'-bis-maleimide of 4,4'-diamino-triphenyl thiophosphate,
the N,N',N''-tris-maleimide of tris-(4-aminophenyl)-phosphate,
the N,N',N''-tris-maleimide of tris-(4-aminophenyl)-phosphite and
the N,N',N''-tris-maleimide of tris-(4-aminophenyl)-thiophosphate.

It is also possible to use mixtures of two or more of these maleimides or poly-maleimides.

The mixtures according to the invention preferably contain such maleimide pre-polymers which are obtained by reaction of a maleimide of the formula I wherein R represents a mono- or bivalent aromatic radical, and n represents the number 1 or 2, with an aromatic diprimary diamine which contains 6–15 C atoms in the molecule, whereby to 1 imido group equivalent there is used 0.1 to 0.6 of an amino group equivalent.

The maleimides particularly prefered for the production of the maleimide pre-polymers are those which are also preferably used in the mixture according to the invention.

The following may be mentioned as examples of suitable diamines for the production of the maleimide pre-polymers: 4,4'-diamino-dicyclohexylmethane, 1,4-diamino-cyclohexane, m-phenylenediamine, p-phenylenediamine, 4,4'-diamino-diphenylmethane, bis-(4-aminophenyl)-2,2-propane, 4,4'-diamino-diphenyl ether, 4,4'-diaminodiphenylsulphone, 1,5-diaminonaphthaline, n-xylylenediamine, p-xylylenediamine, ethylenediamine, hexamethylenediamine, bis-(γ-aminopropyl)-5,5-dimethylhydantoin, 4,4'-diaminotriphenylphosphate, 4,4'-diamino-triphenylthiophosphate and 4,4'-diamino-triphenylphosphite.

The use of m-phenylenediamine, 4,4'-diaminodiphenylmethane, 4,4'-diamino-diphenyl ether or 4,4'-diamino-diphenylsulphone is preferred.

The maleimide pre-polymers are known compounds and can be produced by the process described in the French Pat. No. 1,555,564, in which process the homogeneously mixed, optionally finely ground, starting materials in the given equivalent proportion are heated for a time at 60°–160° C., with the result that a still thermoplastic, partially soluble product is formed. This pre-polymer must, if required, be ground again to obtain a processible powder. Pre-polymerisation can be preformed also by heating a solution of suspension of the starting materials. Suitable substances for the purpose are those which do not react with the starting materials and which, where desired, sufficiently dissolve them. Such liquids are, for example: dimethylformamide, tetramethylurea, dimethylsulphoxide, N-methylpyrrolidone, dichloroethylene, tetrachloroethylene, tetrachloroethane, tetrabromoethane, chlorobenzene, dichlorobenzene, bromobenzene, cyclohexanone, dioxane or alkylated aromatic hydrocarbons.

In a special embodiment of the present invention, the acetone-anil (b) is added to the maleimide pre-polymer already during cooling, so that there is formed a thin to viscous liquid which can be processed in an advantageous manner.

The acetone-anil contained in the curable mixture, namely 2,2,4-trimethyl-1,2-dihydroquinoline, is a known compound obtainable from acetone and aniline by the process described in "Organic Synthesis", Coll. Vol. 3 [1955], page 329.

Suitable as compound (c), which can optionally be contained as copolymerisable constituent in the curable mixture and which contains at least one polymerisable, olefinic double bond in the molecule, are, in particular, vinyl monomers such as styrene, α-methyl styrene, vinyl acetate, vinyl methacrylate or divinyl benzene, acrylic acid esters or methacrylic acid esters of alcohols or phenols, such as methyl acrylate, butyl acrylate, dodecyl acrylate, methyl methacrylate, ethylene glycol dimethacrylate or vinyl methacrylate, as well as acrylo- and methacrylonitrile, and especially allyl compounds which can be present as ethers, esters hydrocarbons and substituted aromatic or heterocyclic compounds, such as diallyl ether, vinyl allyl ether, allyl acetate, o- or m-diallyl phthalate, 3,3'-diallylbisphenol A, allyl isocyanurate or allyl cyanurate. It is also possible to use unsaturated polyesters as copolymerisable compounds (c).

The mixtures according to the invention contain maleimides, or maleimide pre-polymers, and acetone-anil in such a quantity ratio that to 1 imido group equivalent there is present 0.05 to 1 mole, preferably 0.1 to 0.5 mole, of acetone-anil.

The curable mixture can contain several different maleimides of the given formula, as well as the maleimides of different valencies.

If the curable mixture also contains a copolymerisable compound (c), the proportion thereof can be up to 50 per cent by weight relative to the total amount of maleimide and/or maleimide pre-polymer and acetone-anil.

The curing of the mixtures according to the invention to form insoluble cross-linked copolymerisation products is effected by heating the mixtures, optionally containing catalysts or inhibitors, at temperatures of 50° to 300° C., preferably at a temperature of between 80° and 250° C., depending on whether the polymerisation reaction is performed in the melt or in solvents, or in the presence of catalysts or inhibitors.

If the curing is carried out in the melt, temperatures of 100° to 250° C. are particularly well suited, with the curing being commenced advantageously at temperatures below 180° C. In solution, however, even lower temperatures are applicable, for example 50° to 150° C.

The curing of the mixtures according to the invention is performed preferably in the melt, or partially in the melt and partially in the solid phase.

The following substances are given as examples of suitable solvents: chloroform, dioxane, tetrahydrofuran, dimethylformamide, tetramethylurea and N-methylpyrrolidone.

Depending on the application purpose or on the processing, there can be added to the mixtures according to the invention also inhibitors, such as hydroquinone, phenothiazine or indol. The concentration of inhibitors in the reaction mixture is usually between 0.1 and 5% of weight, relative to the total amount of the reacting constituents.

It is also possible to firstly produce from the mixtures according to the invention a further pre-polymer by heating the homogeneously mixed, optionally finely ground starting materials for a time at 50°–150° C., so that there is formed a still thermoplastic, partially soluble product. This pre-polymer has, is required, to be ground again to obtain a workable powder. Pre-polymerisation can also be effected by heating a solution or suspension of the starting materials. Suitable substances for the purpose are those which do not react with the starting materials and which, if desired, adequately dissolve them. Such liquids are, for example, the organic solvents already mentioned in the foregoing.

It is also possible to produce the pre-polymer by firstly adding one of the two reactants in an amount which is greatly deficient, and producing, by heating of the resulting mixture at 50° to 150° C., a still fusible, sufficiently soluble prepolymer. This product can, after addition of the lacking amount of the constituent initially present in too low an amount, be subsequently finally cured during the ultimate processing.

The curable mixtures according to the invention are used, in particular, in the field of electrical engineering and in laminating processes. They can be employed, as a formulation adapted to suit in each case the specific purpose of application, in the unfilled or filled condition, optionally in the form of solutions or dispersions, as dipping resins, casting resins, impregnating resins, bonding agents, laminating resins, moulding materials and foam resins.

The invention relates therefore also to a process for producing cross-linked, insoluble and infusible copolymerisation products, in which process (a) maleimides of the general formula I

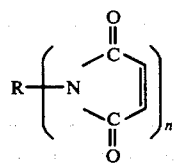

wherein R represents an n-valent aliphatic or aromatic radical, and n represents the number 1, 2 or 3, and/or maleimide pre-polymers obtained by reaction of maleimides of the formula I with an aliphatic, cycloaliphatic or aromatic diprimary diamine containing 2–40 C atoms in the molecule, whereby to 1 imido group equivalent is used 0.05 to 1 amino group equivalent, are copolymerised with (b) acetone-anil, and, optionally, (c) a copolymerisable compound containing at least one olefinic C=C double bond in the molecule, at temperatures of 50° to 300° C., preferably between 80° and 250° C.

The cross-linked infusible copolymerisation products are produced according to the invention as a rule with simultaneous moulding of the material into the form of shaped articles, sheet materials, laminates or bonds. At the same time, there can be added to the curable compounds the additives customarily used in the curable plastics industry, such as fillers, plasticisers, pigments, dyes, mould release agents or fire-retarding substances. As fillers, it is possible to use for example: glass fibres, mica, quartz powder, kaolin, colloidal silicon dioxide or metal powder; and calcium stearate for example can be used as a mould release agent. Moulding can be performed in the compression moulding process by brief rapid heating in a press to preferably 170°–250° C. at a pressure of 1–200 kp/cm². The moulded articles obtained already have adequate mechanical strength, so that they can be completely cured, outside the press, in an oven at 200°–280° C.

If a pre-polymer is firstly produced from the curable mixtures, this can be ground to a fine powder and applied as a coating by the whirl sinter process.

A solution or suspension of the pre-polymer in a suitable solvent can be used for producing laminates by a process wherein porous sheet materials, such as fabrics, fibre mats or fibre fleeces, especially glass fibre mats or glass fabrics, are impregnated with solutions or suspensions, and the solvent is removed by a drying operation. Further curing is effected in a press peferably at 170°–250° C. and 1–200 kp/cm² pressure. It is also possible to merely pre-cure the laminates in the press and to subsequently cure the resulting products in an oven at 200°–280° C. until the optimum performance characteristics are obtained.

EXAMPLES 1–3

The mixtures which are given in the following Table I and which are based on N,N'-4,4'-diphenylmethane-bis-maleimide are each placed into a round-bottomed flask. After connection to a rotary evaporator, the mixture is heated by means of an oil bath at 120° to 140° C. A melt is formed and is degassed under vacuum (15 mm Hg). Air is then admitted and the melt is poured into moulds preheated to 140° C., the dimensions of each mould being 150 × 150 × 4 mm³. The mixtures are subsequently polymerised in an oven according to the following temperature program:

4 hours at 140° C.,
2 hours at 160° C.,
2 hours at 180° C. and
24 hours at 200° C.

Standard test specimens are cut from the plates obtained, and their properties, which are given in the following Table I, are determined.

Table I

| Example | Parts of "bis-imide I"[1] | Parts of acetone-anil | Parts of indol[2] | Moles of acetone-anil to 1 imido group equivalent | Flexural strength according to VSM[3] 77 103 [N/mm$^2$] | Impact strength according to VSM 77 105 [N.cm/mm$^2$] | Indentation hardness according to VDE[4] [N/mm$^2$] | Heat distortion temperature to Martens DIN[5]53461 [°C.] | Water absorption according to DIN 53 495 4 days, 23° C. [%] |
|---|---|---|---|---|---|---|---|---|---|
| 1 | 91 | 8,8 | 4 | 0,1 | 97,1 | 0,68 | 145 | 300 | 1,39 |
| 2 | 83,8 | 16,2 | 4 | 0,2 | 104,0 | 1,05 | 140 | 253 | 1,32 |
| 3 | 77,5 | 22,5 | 4 | 0,3 | 80,4 | 0,48 | 142 | 220 | 0,91 |
| comparison A | 100 | — | 4 | 0 | 40,2 | 0,10 | 145 | 260 | 0,87 |

[1]"bis-imide I"= N,N'-4,4'-diphenylmethane-bis-maleimide
[2]inhibitor for lengthening pot life
[3]VSM = standards of the Verein Schweizerischer Maschinenindustrieller (Association of Swiss Engineering Industrialists)
[4]VDE = standards of the Verein Deutscher Elektrotechniker (Association of German Electrical Engineers)
[5]DIN = Deutsche Industrie-Norm (German Industrial Standard)

Heat ageing test on cured product according to Example 2

Specimens of dimensions 60 × 10 × 4 mm are stored for several days at 270° C. in a drying chamber, and subsequently the flexural strength, the loss in weight and the water absorption of the specimens are determined. The results are given in Table II.

Table II

| Time [days] | Temperature [°C.] | Flexural strength according to VSM 77 103 [N/mm$^2$] | Loss in weight [%] | Water absorption after 4 days at 23° C. [%] |
|---|---|---|---|---|
| 0 | 270 | 73,4 | 0 | 0,93 |
| 5 | 270 | 93,9 | 2,96 | 0,98 |
| 10 | 270 | 93,7 | 3.91 | 1,42 |
| 20 | 270 | 95,3 | 4,94 | 0,87 |
| 40 | 270 | 76,9 | 6,91 | 0.91 |

EXAMPLES 4–6

The mixtures which are listed in the following Table III and which are composed of N,N'-4,4'-diphenylmethane-bis-maleimide (bis-imide I), 3,3'-diallylbisphenol A (diallylbisphenol) and acetone-anil are processed as in Example I and subsequently polymerised according to the following temperature program:
  6 hours at 120° C.,
  6 hours at 175° C. and
  10 hours at 250° C.

The ageing test is carried out on specimens of dimensions 60 × 10 × 4 mm, in which test the specimens are stored for several days at 270° C. in a drying chamber, after which time the mechanical and electrical properties given in Table III are measured.

The results of the measurements show that the moulded specimens produced from the mixtures according to the invention are characterised by a high resistance to heat ageing.

Table III

| | Mixture | | | | Mechanical properties | | Electrical properties | | | |
|---|---|---|---|---|---|---|---|---|---|---|
| | | | | Storage time at 270° C. [days] | Loss in weight [%] | Flexural strength according to VSM 77 103 [N/mm$^2$] | Dielectric constant [Θ] | | Dielectric loss factor [tan δ × 10$^2$] | |
| Example | BISIMIDE I | DIALLYL BISPHENOL | ACETONE ANIL | | | | 180° C. | 220° C. | 180° C. | 220° C. |
| 4 | 1 mole | 0.6 mole | 0.2 mole | 0 | — | 136,8 | 3,4 | 3,3 | 0,24 | 0,24 |
| | | | | 3 | 1,34 | 112,7 | 3,3 | 3,2 | 0,24 | 0,17 |
| | | | | 10 | 2,37 | 96,9 | 3,3 | 3,2 | 0,25 | 0,22 |
| | | | | 20 | 3,21 | 120,3 | 3,3 | 3,3 | 0,24 | 0,27 |
| | | | | 30 | 4,04 | 106,0 | | | | |
| | | | | 40 | 4,79 | 113,6 | | | | |
| 5 | 1 mole | 0.4 mole | 0.2 mole | 0 | — | 138,5 | 3,3 | 3,2 | 0,17 | 0,15 |
| | | | | 3 | 1,35 | 121,6 | 3,3 | 3,2 | 0,20 | 0,15 |
| | | | | 10 | 2,30 | 112,0 | 3,3 | 3,2 | 0,15 | 0,15 |
| | | | | 20 | 3,15 | 110,6 | 3,3 | 3,2 | 0,19 | 0,17 |
| | | | | 30 | 3,93 | 106,4 | | | | |
| | | | | 40 | 4,63 | 112,4 | | | | |
| 6 | 1 mole | 0.4 mole | 0.4 mole | 0 | — | 11 61,5 | 3,4 | 3,4 | 0,35 | 0,50 |
| | | | | 3 | 1,65 | 80,1 | 3,3 | 3,3 | 0,41 | 0,60 |
| | | | | 10 | 3,37 | 82,9 | 3,4 | 3,5 | 0,64 | 1,78 |
| | | | | 20 | 5,03 | 68,7 | 3,4 | 3,5 | 0,55 | 1,20 |
| | | | | 30 | 6,34 | 92,1 | | | | |
| | | | | 40 | 7.27 | 63.0 | | | | |

EXAMPLES 7–10

The mixtures which are listed in the following Table IV and which are composed of N,N'-4,4'-diphenylmethane-bis-maleimide (bis-imide I), o-diallylphthalate and acetone-anil as well as 1% by weight of di-tert.-butyl peroxide as a catalyst are processed as in Example 1, and are subsequently polymerised according to the following temperature program:
  6 hours at 120° C.,
  6 hours at 175° C. and
  10 hours at 250° C.

The ageing test is carried out on the specimens of dimensions 60 × 10 × 4 mm, in which test the specimens are stored for several dyes at 270° C. in a drying chamber, after which time the properties given in Table IV are determined.

It is shown from the results obtained that the moulded specimens produced from the mixtures according to the invention are characterised by a high resistance to heat ageing.

chamber, after which time the properties shown in Table V are determined.

The results obtained show that the moulded specimens produced from the mixtures according to the invention are distinguished by a high resistance to heat ageing.

Table V

| | Mixture Pre-polymer from | | | Storage time at 270° C. [days] | Loss in weight [%] | Mechanical properties Flexural strength according to VSM 77 103 [N/mm²] | Electrical properties | | | |
|---|---|---|---|---|---|---|---|---|---|---|
| | | | | | | | Dielectric constant [ε] | | Dielectric loss factor [tan δ × 10²] | |
| Example | BISIMIDE I | 4,4'-Diamino-diphenyl methane | ACETONE-ANIL | | | | 1° C. | 220° C. | 180° C | 220° C. |
| 11 | 1 mole | 0.4 mole | 0.1 mole | 0 | — | 114,9 | 3,5 | 3,4 | 0,36 | 0,6 |
| | | | | 3 | 1,51 | 95,4 | 3,4 | 3,4 | 0,36 | 0,44 |
| | | | | 10 | 2,8 | 89,4 | | | | |
| 12 | 1 mole | 0.4 mole | 0.2 mole | 0 | — | 98,9 | 3,6 | 3,6 | 0,56 | 1,06 |
| | | | | 3 | 1,53 | 104,6 | 3,5 | 3,5 | 0,50 | 0,63 |
| | | | | 10 | 2,5 | 93,9 | | | | |
| 13 | 1 mole | 0.4 mole | 0.3 mole | 0 | — | 92,5 | 3,6 | 3,6 | 1,06 | 2,67 |
| | | | | 3 | 1,65 | 84,0 | 3,5 | 3,5 | 0,6 | 0,93 |
| | | | | 10 | 3,75 | 102,3 | | | | |
| 14 | 1 mole | 0.2 mole | 0.2 mole | 0 | — | 104,2 | 3,4 | 3,3 | 0,26 | 0,33 |
| | | | | 3 | 1,66 | 99,2 | 3,3 | 3,3 | 0,22 | 0,24 |
| | | | | 10 | 2,66 | 102,8 | | | | |
| 15 | 1 mole | 0.2 mole | 0.3 mole | 0 | — | 109,6 | 3,4 | 3,4 | 0,28 | 0,30 |
| | | | | 3 | 1,44 | 88,7 | 3,4 | 3,3 | 0,25 | 0,34 |
| | | | | 10 | 2,42 | 84,6 | | | | |

Table IV

| | Mixture | | | Storage time at 270° C. [days] | Loss in weight [%] | Mechanical properties Flexural strength according to VSM 77 103 [N/mm²] | Elctrical properties | | | |
|---|---|---|---|---|---|---|---|---|---|---|
| | | | | | | | Dielectric constant [ε] | | Dielectric loss factor [tan δ × 10²] | |
| Example | BISIMIDE I | o-DIALLYL PHTHALATE | ACETONE-ANIL | | | | 180° C. | 220° C. | 180° C | 220° C. |
| 7 | 1 mole | 0.4 mole | 0.2 mole | 0 | — | 86,1 | 3,5 | 3,5 | 0,56 | 0,42 |
| | | | | 3 | 3,22 | 83,1 | 3,6 | 3,6 | 0,65 | 0,46 |
| | | | | 10 | 5,43 | 98,1 | | | | |
| 8 | 1 mole | 0.6 mole | 0.2 mole | 0 | — | 84,1 | 3,6 | 3,6 | 0,60 | 0,5 |
| | | | | 3 | 2,64 | 84,3 | 3,8 | 3,9 | 0,70 | 0,63 |
| | | | | 10 | 4,69 | 74,7 | | | | |
| 9 | 1 mole | 0.4 mole | 0.4 mole | 0 | — | 96,2 | 3,5 | 3,6 | 0,67 | 0,81 |
| | | | | 3 | 3,11 | 84,1 | 3,3 | 3,4 | 0,64 | 1,04 |
| | | | | 10 | 5,24 | 52,3 | | | | |
| 10 | 1 mole | 0.6 mole | 0.4 mole | 0 | — | 106,4 | 3,7 | 3,8 | 0,94 | 1,75 |
| | | | | 3 | 2,44 | 71,8 | 3,3 | 3,5 | 0,82 | 1,62 |
| | | | | 10 | 2,80 | 53,0 | | | | |

EXAMPLES 11–15

The mixtures which are listed in the following Table V and which are composed of acetone-anil and a prepolymer obtained by briefly heating N,N'-4,4'-diphenylmethane-bis-maleimide (bisimide I) with 4,4'-diaminodiphenylmethane in the given molar ratio at 120° C. with subsequent cooling are processed as described in Example 1, and are subsequently polymerised according to the following temperature program:

6 hours at 120° C.,
6 hours at 175° C. and
10 hours at 250° C.

The ageing test is carried out on the specimens of dimensions 60 × 10 × 4 mm, in which test the specimens are stored for several days at 270° C. in a drying

We claim:

1. A curable composition which consists essentially of (a) a maleimide of the general formula I

wherein R denotes an n-valent aliphatic or aromatic radical, and n denotes the number 2; and (b) 2,2,4-trimethyl-1,2-dihydroquinoline, in such ratio that for 1 imido group equivalent there is present 0.05 to 1 mole of 2,2,4-trimethyl-1,2-dihydroquinoline.

2. A composition according to claim 1 wherein maleimide of formula I is

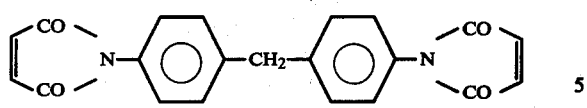

3. A composition according to claim 1, wherein R represents a bivalent aromatic radical, and n represents the number 2.

4. A composition according to claim 1, wherein R represents an unsubstituted phenylene radical or a phenylene radical substituted by methyl, or a radical of the formula

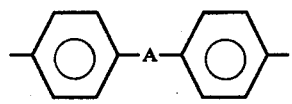

wherein A represents methylene, an ether oxygen atom or sulphonyl.

5. A composition according to claim 1, wherein the components (a) and (b) are in such a ratio that to 1 imido group equivalent there is present 0.1 to 0.5 mole of 2,2,4-trimethyl-1,2-dihydroquinoline.

* * * * *